United States Patent
Dods

(10) Patent No.: US 10,972,508 B1
(45) Date of Patent: Apr. 6, 2021

(54) GENERATING A NETWORK SECURITY POLICY BASED ON BEHAVIOR DETECTED AFTER IDENTIFICATION OF MALICIOUS BEHAVIOR

(71) Applicant: Juniper Networks, Inc., Sunnyvale, CA (US)

(72) Inventor: Craig Dods, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 106 days.

(21) Appl. No.: 16/206,001

(22) Filed: Nov. 30, 2018

(51) Int. Cl.
  *H04L 29/06* (2006.01)
  *G06N 20/00* (2019.01)

(52) U.S. Cl.
  CPC .......... *H04L 63/20* (2013.01); *H04L 63/0236* (2013.01); *H04L 63/101* (2013.01); *H04L 63/14* (2013.01); *H04L 63/145* (2013.01); *H04L 63/1425* (2013.01); *H04L 63/1433* (2013.01); *G06N 20/00* (2019.01)

(58) Field of Classification Search
  CPC ............. H04L 63/1425; H04L 63/1433; H04L 63/145; H04L 63/101; H04L 63/20; H04L 63/14; H04L 63/0236
  See application file for complete search history.

(56) References Cited

U.S. PATENT DOCUMENTS

| | | | |
|---|---|---|---|
| 8,346,929 B1 | 1/2013 | Lai | |
| 8,402,540 B2 | 3/2013 | Kapoor et al. | |
| 8,615,785 B2 | 12/2013 | Elrod et al. | |
| 8,682,812 B1 * | 3/2014 | Ranjan | H04L 63/1425 706/12 |
| 8,762,298 B1 * | 6/2014 | Ranjan | G06N 5/02 706/12 |
| 8,776,168 B1 | 7/2014 | Gibson et al. | |
| 8,782,790 B1 * | 7/2014 | Smith | H04L 63/1416 726/24 |

(Continued)

OTHER PUBLICATIONS

N. Nissim, A. Cohen and Y. Elovici, "ALDOCX: Detection of Unknown Malicious Microsoft Office Documents Using Designated Active Learning Methods Based on New Structural Feature Extraction Methodology," in IEEE Transactions on Information Forensics and Security, vol. 12, No. 3, pp. 631-646, Mar. 2017. (Year: 2017).*

(Continued)

*Primary Examiner* — Kari L Schmidt
(74) *Attorney, Agent, or Firm* — Harrity & Harrity, LLP

(57) ABSTRACT

A device receives information identifying malicious behavior by a compromised endpoint device associated with a network and traffic associated with the compromised endpoint device after the malicious behavior is identified. The device receives endpoint device information identifying other endpoint devices associated with the network, wherein the compromised endpoint device is not one of the other endpoint devices. The device receives network device information identifying network devices associated with the network, and processes the traffic, the endpoint device information, and the network device information, with a machine learning model, to generate a security policy to isolate the malicious behavior. The device performs one or more actions based on the security policy to isolate the malicious behavior.

20 Claims, 14 Drawing Sheets

(56) References Cited

U.S. PATENT DOCUMENTS

| | | | |
|---|---|---|---|
| 9,124,636 B1* | 9/2015 | Rathor | H04L 63/1441 |
| 9,154,479 B1* | 10/2015 | Sethi | H04L 63/08 |
| 9,336,385 B1 | 5/2016 | Spencer et al. | |
| 10,070,412 B1* | 9/2018 | Liu | H04W 68/04 |
| 10,462,171 B2* | 10/2019 | Weingarten | G06F 8/61 |
| 10,771,506 B1* | 9/2020 | Kumar | G06N 20/00 |
| 10,803,169 B1* | 10/2020 | Flatten | G06N 20/00 |
| 10,812,521 B1* | 10/2020 | Sharifi Mehr | H04L 63/1433 |
| 10,862,597 B2* | 12/2020 | Shattil | H04W 12/02 |
| 2007/0192863 A1* | 8/2007 | Kapoor | H04L 67/10 726/23 |
| 2011/0191847 A1* | 8/2011 | Davis | H04L 63/1425 726/22 |
| 2012/0096519 A1* | 4/2012 | Alanara | H04L 63/123 726/3 |
| 2014/0173712 A1* | 6/2014 | Ferdinand | H04L 63/1425 726/11 |
| 2014/0317735 A1* | 10/2014 | Kolbitsch | H04L 63/145 726/23 |
| 2015/0269383 A1* | 9/2015 | Lang | H04L 63/20 726/1 |
| 2016/0359695 A1* | 12/2016 | Yadav | G06N 20/00 |
| 2017/0103201 A1* | 4/2017 | Fox | G06F 21/566 |
| 2017/0118242 A1* | 4/2017 | Georgescu | H04L 63/1458 |
| 2017/0180416 A1* | 6/2017 | Giura | H04L 63/1458 |
| 2017/0300690 A1* | 10/2017 | Ladnai | G06F 21/554 |
| 2017/0359309 A1* | 12/2017 | Bolte | H04W 12/08 |
| 2018/0026993 A1* | 1/2018 | Parla | H04L 63/1425 726/23 |
| 2018/0097840 A1* | 4/2018 | Murthy | H04L 63/02 |
| 2018/0139240 A1* | 5/2018 | Voit | H04L 63/1433 |
| 2018/0227322 A1* | 8/2018 | Luo | H04L 63/1425 |
| 2018/0278648 A1* | 9/2018 | Li | H04L 63/104 |
| 2018/0343310 A1* | 11/2018 | Mishra | H04L 63/08 |
| 2018/0375862 A1* | 12/2018 | Isola | H04L 63/0876 |
| 2018/0375884 A1* | 12/2018 | Kopp | H04L 63/1425 |
| 2019/0014086 A1* | 1/2019 | Meyer | G06F 21/554 |
| 2019/0052659 A1* | 2/2019 | Weingarten | H04L 67/34 |
| 2019/0098050 A1* | 3/2019 | Lumezanu | G06N 20/00 |
| 2019/0108338 A1* | 4/2019 | Saxe | G06F 21/565 |
| 2019/0109877 A1* | 4/2019 | Samuel | G06F 21/53 |
| 2019/0312839 A1* | 10/2019 | Grimm | H04L 63/1416 |
| 2019/0312888 A1* | 10/2019 | Grimm | H04L 63/02 |
| 2019/0387005 A1* | 12/2019 | Zawoad | H04L 63/1425 |
| 2020/0053090 A1* | 2/2020 | Kliger | G06F 21/604 |
| 2020/0067935 A1* | 2/2020 | Carnes, III | H04L 63/105 |
| 2020/0120121 A1* | 4/2020 | Aggarwal | H04L 63/164 |
| 2020/0236112 A1* | 7/2020 | Pularikkal | H04L 63/104 |

OTHER PUBLICATIONS

P. Dutta, G. Ryan, A. Zieba and S. Stolfo, "Simulated User Bots: Real Time Testing of Insider Threat Detection Systems," 2018 IEEE Security and Privacy Workshops (SPW), San Francisco, CA, 2018, pp. 228-236. (Year: 2018).*

Pal, Partha, et al. "Adaptive resource management enabling deception (ARMED)." Proceedings of the 12th International Conference on Availability, Reliability and Security. 2017, pp. 1-8. (Year: 2017).*

Meidan, Yair, et al. "N-baiot—network-based detection of iot botnet attacks using deep autoencoders." IEEE Pervasive Computing 17.3 (2018): 12-22. (Year: 2018).*

* cited by examiner

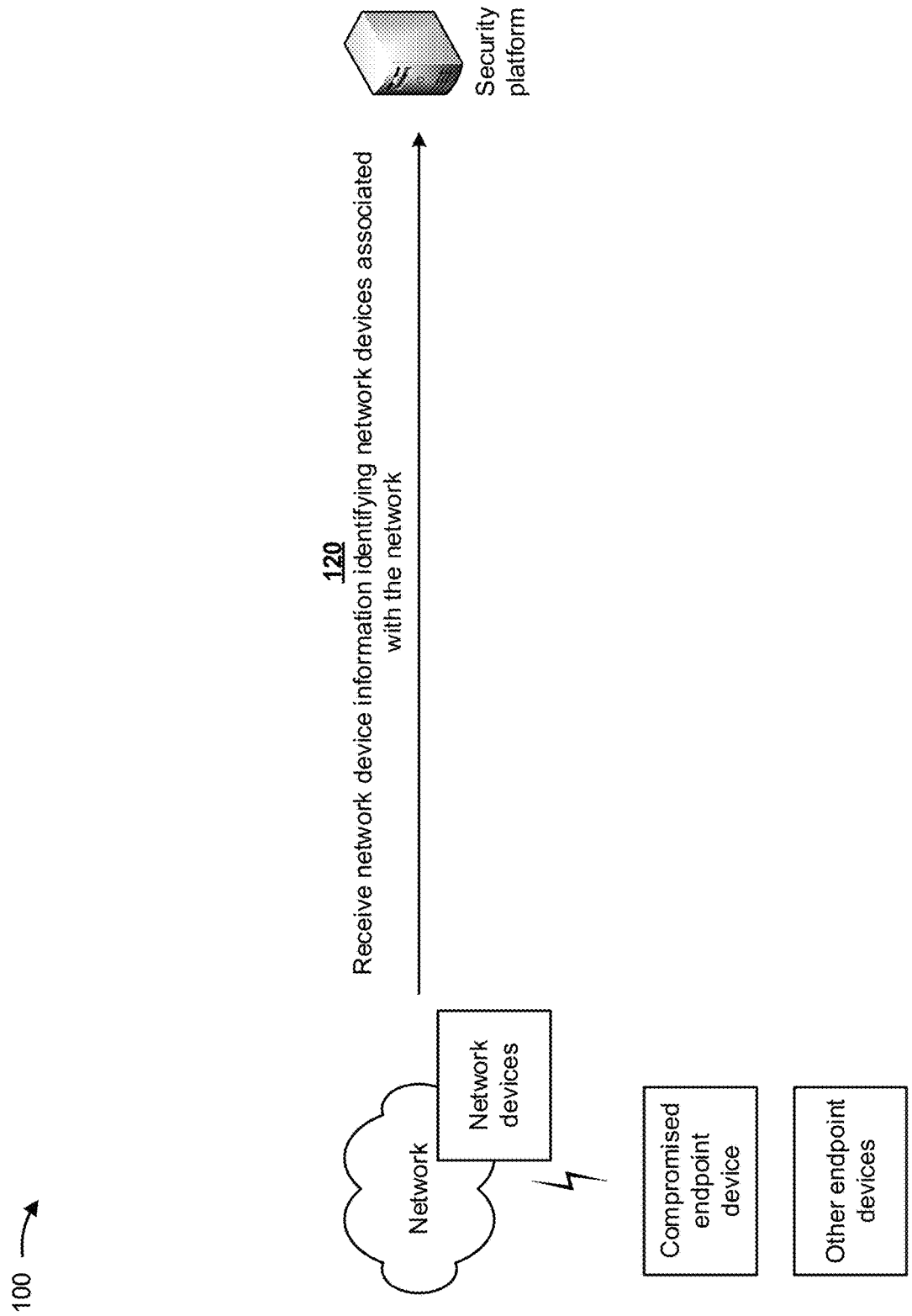

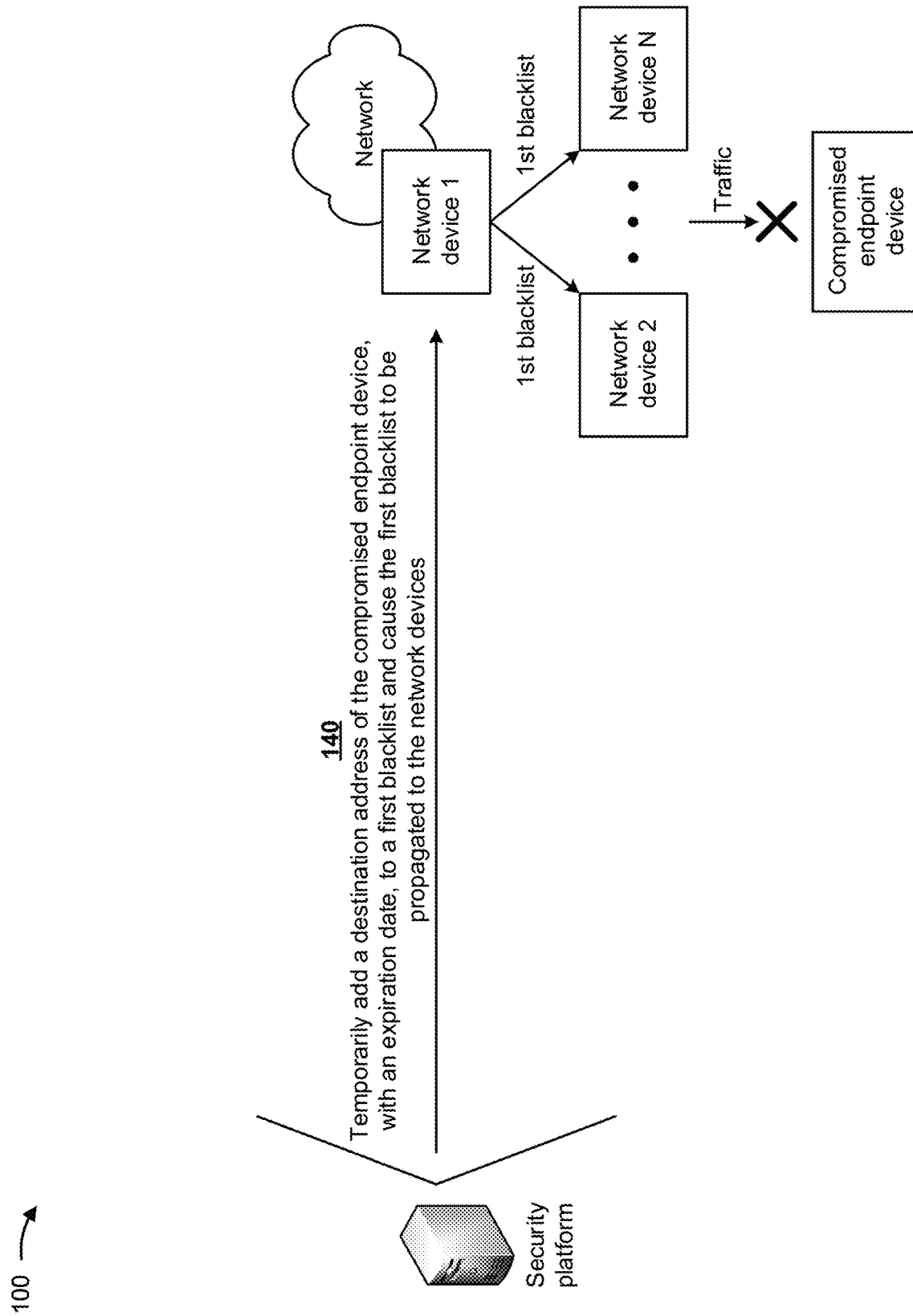

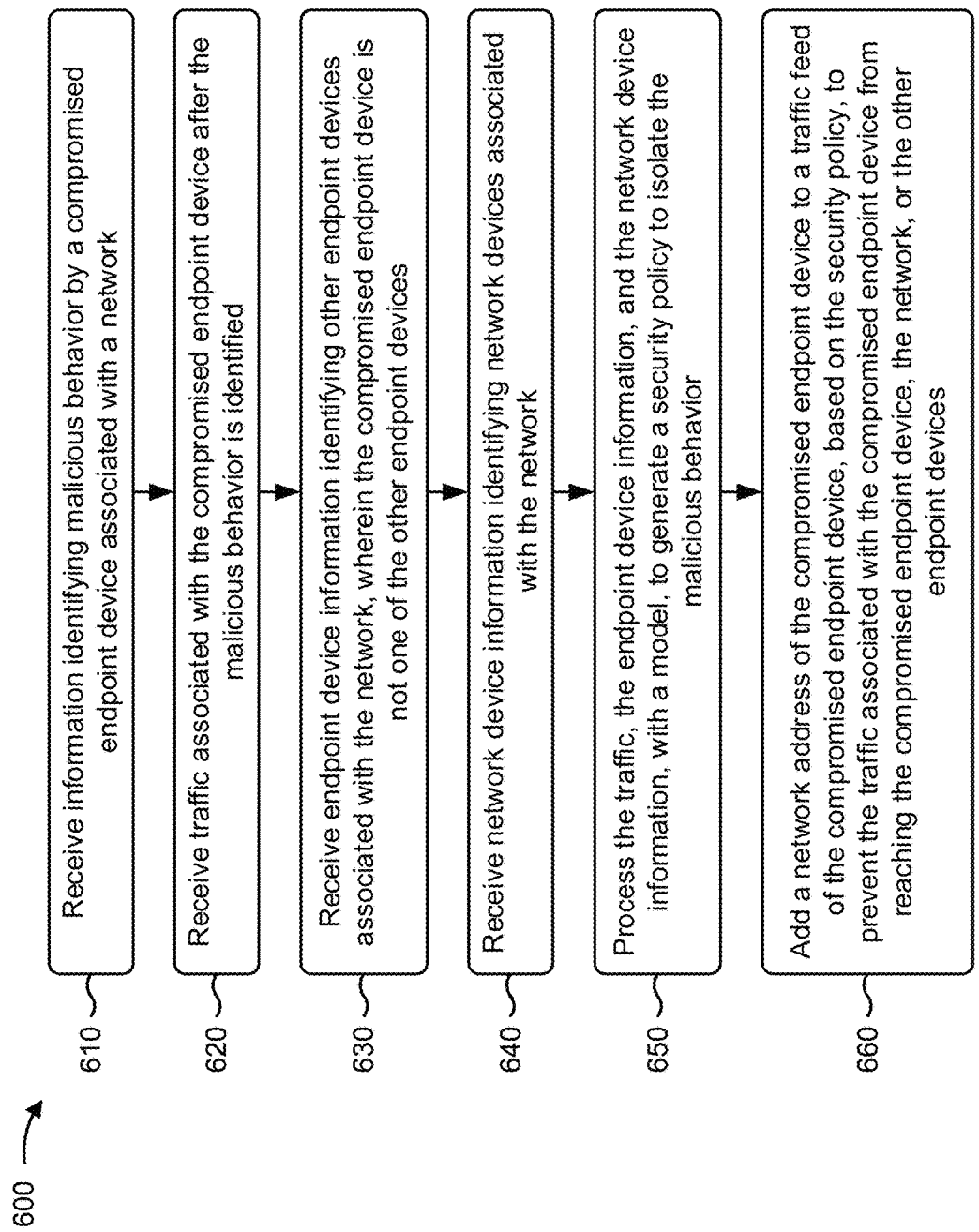

GENERATING A NETWORK SECURITY POLICY BASED ON BEHAVIOR DETECTED AFTER IDENTIFICATION OF MALICIOUS BEHAVIOR

BACKGROUND

Identifying malicious behavior (e.g., a cyberattack, malware, and/or the like) is typically a time-consuming process for a network security team. Many products exist that attempt to lure or trap a bad actor (e.g., a network intruder) into revealing themselves, and that trigger a wide variety of actions from a network (e.g., blocking the network intruder, stopping malware and/or cyberattack, and/or the like).

SUMMARY

According to some implementations, a method may include receiving information identifying malicious behavior by a compromised endpoint device associated with a network and traffic associated with the compromised endpoint device after the malicious behavior is identified. The method may include receiving endpoint device information identifying other endpoint devices associated with the network, wherein the compromised endpoint device may not be one of the other endpoint devices. The method may include receiving network device information identifying network devices associated with the network, and processing the traffic, the endpoint device information, and the network device information, with a machine learning model, to generate a security policy to isolate the malicious behavior. The method may include performing one or more actions based on the security policy to isolate the malicious behavior.

According to some implementations, a device may include one or more memories, and one or more processors to receive information identifying malicious behavior by a compromised endpoint device associated with a network, wherein the network may be associated with one or more network devices and one or more other endpoint devices, and wherein the compromised endpoint device may not be one of the one or more other endpoint devices. The one or more processors may receive traffic associated with the compromised endpoint device after the malicious behavior is identified and may receive endpoint device information identifying the one or more other endpoint devices. The one or more processors may receive network device information identifying the one or more network devices and may process the traffic, the endpoint device information, and the network device information, with a machine learning model, to generate a security policy to isolate the malicious behavior and the compromised endpoint device. The one or more processors may perform one or more actions based on the security policy to isolate the malicious behavior.

According to some implementations, a non-transitory computer-readable medium may store instructions that include one or more instructions that, when executed by one or more processors of a device, cause the one or more processors to receive information identifying malicious behavior by a compromised endpoint device associated with a network. The one or more instructions may cause the one or more processors to receive traffic associated with the compromised endpoint device after the malicious behavior is identified and receive endpoint device information identifying other endpoint devices associated with the network, wherein the compromised endpoint device may not be one of the other endpoint devices. The one or more instructions may cause the one or more processors to receive network device information identifying network devices associated with the network and process the traffic, the endpoint device information, and the network device information, with a model, to generate a security policy to isolate the malicious behavior. The one or more instructions may cause the one or more processors to add a network address of the compromised endpoint device to a traffic feed of the compromised endpoint device, based on the network policy, to prevent the traffic associated with the compromised endpoint device from reaching the compromised endpoint device, the network, or the other endpoint devices.

BRIEF DESCRIPTION OF THE DRAWINGS

FIGS. 1A-1I are diagrams of one or more example implementations described herein.

FIGS. 4-6 are flow charts of example processes for generating a network security policy based on behavior detected after identification of malicious behavior.

DETAILED DESCRIPTION

Figure 1A:
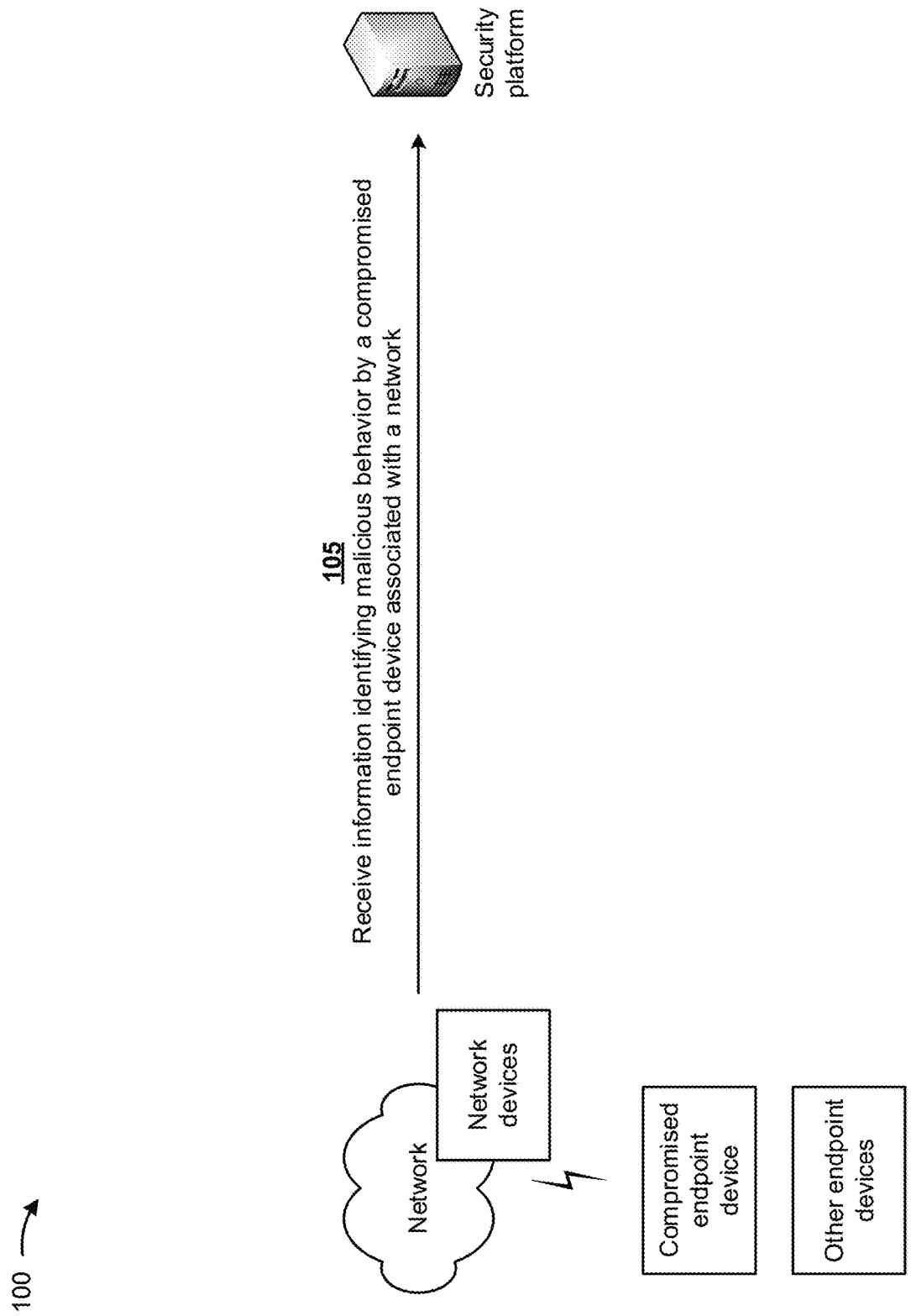

The following detailed description of example implementations refers to the accompanying drawings. The same reference numbers in different drawings may identify the same or similar elements.

Malicious behavior, such as a cyberattack, malware, and/or the like, may be caused by a bad actor (e.g., a network intruder) based on compromising an endpoint device associated with a network. The malicious behavior and/or the bad actor may be addressed if the malicious behavior and/or the bad actor are identified. However, identifying the malicious behavior and/or the bad actor provides little insight into network behavior caused by the malicious behavior. Determining insight into such network behavior may be difficult, time consuming, and waste resources (e.g., processing resources, memory resources, and/or the like). One technique detects the malicious behavior (e.g., that a malicious file has been downloaded) but provides no indication of whether the malicious file has been executed by an endpoint device and is prone to false positive and/or negative indications of the malicious behavior. Another technique detects a malicious communication to an Internet protocol (IP) or uniform resource locator (URL) address but is prone to false positive and/or negative indications of malicious behavior and does not detect targeted network attacks.

Some implementations described herein provide a security platform that generates a network security policy based on behavior detected after identification of malicious behavior. For example, the security platform may receive information identifying malicious behavior by a compromised endpoint device associated with a network and traffic associated with the compromised endpoint device after the malicious behavior is identified. The security platform may receive endpoint device information identifying other endpoint devices associated with the network, wherein the compromised endpoint device is not one of the other endpoint devices. The security platform may receive network device information identifying network devices associated with the network, and may process the traffic, the endpoint device information, and the network device information, with a machine learning model, to generate a security policy to isolate the malicious behavior. The security platform may perform one or more actions based on the security policy to isolate the malicious behavior.

In this way, the security platform reduces a time it takes to determine insights into network behavior caused by malicious behavior, which conserves resources (e.g., processing resources, memory resources, and/or the like) utilized to attempt to determine such insights. The security platform also detects targeted network attacks and reduces the occurrence of false positive and/or negative indications of the malicious behavior, which conserves resources (e.g., processing resources, memory resources, and/or the like) that may otherwise be wasted in attempting to address false positive indications of the malicious behavior.

FIGS. 1A-1I are diagrams of one or more example implementations 100 described herein. As shown in FIG. 1A, a network may be associated with a security platform. As further shown in FIG. 1A, the network may include multiple network devices and multiple endpoint devices. In some implementations, malicious behavior, such as a cyberattack, malware, and/or the like, may be caused by a bad actor (e.g., a network intruder) based on compromising one of the endpoint devices (e.g., a compromised endpoint device). In some implementations, one or more network devices may identify the malicious behavior.

As further shown in FIG. 1A, and by reference number 105, the security platform may receive, from the one or more network devices, information identifying the malicious behavior by the compromised endpoint device associated with the network. In some implementations, the information identifying the malicious behavior may include information identifying the malicious behavior (e.g., that a malicious file has been downloaded), a malicious communication to a network address, such as a media access control (MAC) address associated with the compromised endpoint device, an internet protocol (IP) address associated with the compromised endpoint device, a uniform resource locator (URL) address associated with the compromised endpoint device, and/or the like, a serial number associated with the compromised endpoint device, information identifying a manufacturer associated with the compromised endpoint device, information identifying a make or model associated with the compromised endpoint device, and/or the like.

Figure 1B:
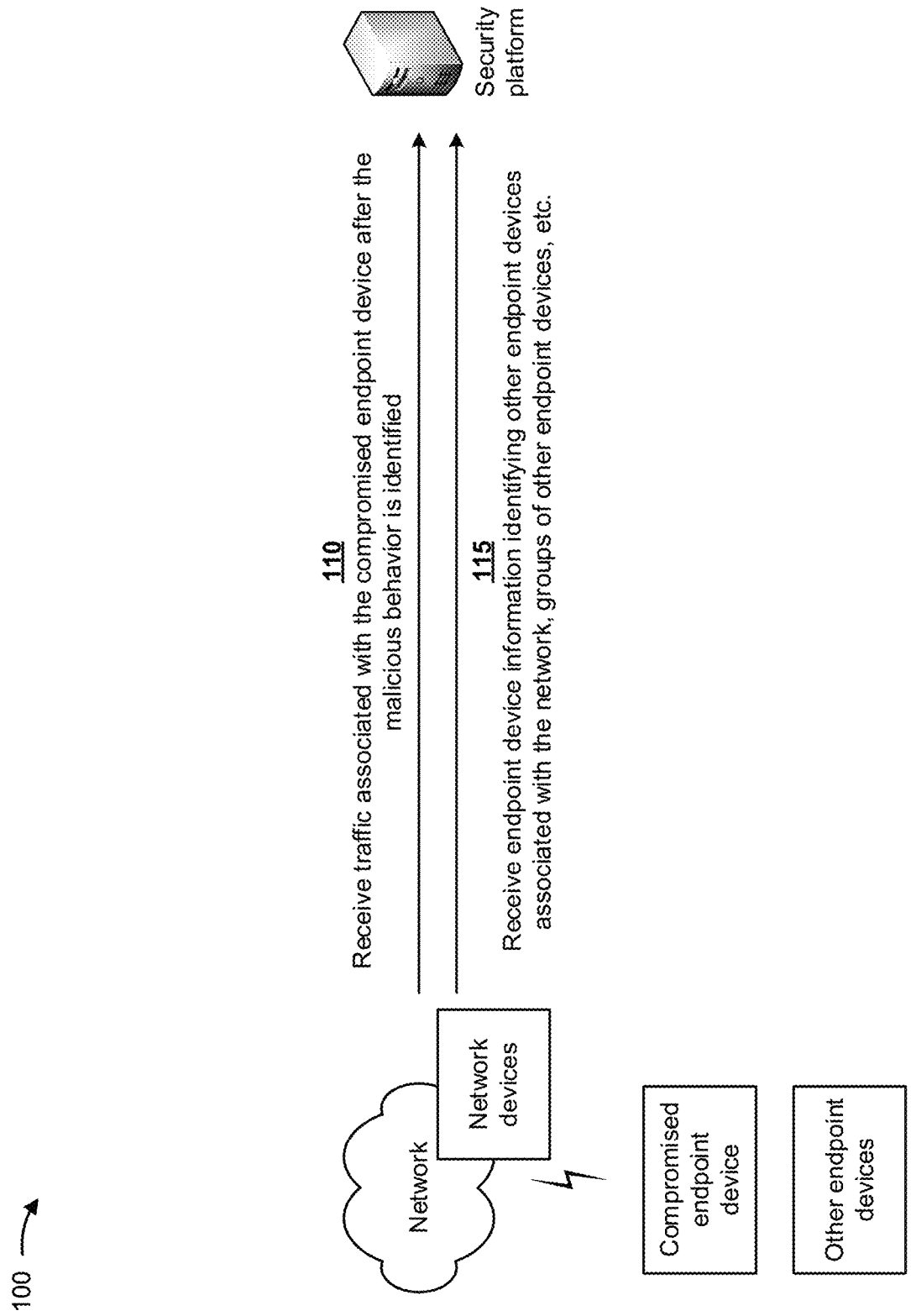

As shown in FIG. 1B, and by reference number 110, the security platform may receive (e.g., from one or more of the network devices) traffic or traffic information (e.g., header information, payload information, and/or the like) associated with the compromised endpoint device after the malicious behavior is identified. In some implementations, the traffic associated with the compromised endpoint device may include traffic attempting to spread the malicious behavior within the network, to one or more of the other endpoint devices, to one or more of the network devices, and/or the like. In some implementations, the one or more of the network devices may automatically provide the traffic or traffic information associated with the compromised endpoint device to the security platform based on identifying the malicious behavior. In some implementations, the security platform may configure the one or more of the network devices, once the security platform is notified of the malicious behavior, to start forwarding any traffic where the compromised endpoint device is a source or a destination.

As further shown in FIG. 1B, and by reference number 115, the security platform may receive (e.g., from one or more of the network devices or from the other endpoint devices) endpoint device information identifying the other endpoint devices associated with the network, groups of the other endpoint devices, and/or the like. In some implementations, the endpoint device information, for each of the other endpoint devices, may include a MAC address associated with the other endpoint device, an IP address associated with the other endpoint device, a URL associated with the other endpoint device, a serial number associated with the other endpoint device, information identifying a manufacturer associated with the other endpoint device, information identifying a make or model associated with the other endpoint device, topology information (e.g., information identifying neighboring endpoint devices and/or network devices, interconnections between the endpoint devices and/or the network devices, etc.), and/or the like. In some implementations, the security platform may configure the other endpoint devices and/or the network devices to forward the endpoint device information once the security platform is notified of the malicious behavior.

As shown in FIG. 1C, and by reference number 120, the security platform may receive (e.g., from the network devices) network device information identifying the network devices associated with the network. In some implementations, the network device information, for a network device, may include a MAC address associated with the network device, an IP address associated with the network device, a serial number associated with the network device, information identifying a manufacturer associated with the network device, information identifying a make or model associated with the network device, topology information (e.g., information identifying neighboring endpoint devices and/or network devices, interconnections between the endpoint devices and/or the network devices, etc.), and/or the like. In some implementations, the security platform may configure the network devices to forward the network device information once the security platform is notified of the malicious behavior.

In some implementations, the security platform may store the traffic associated with the compromised endpoint device, the endpoint device information, and/or the network device information in a data structure (e.g., a database, a table, a list, and/or the like) associated with the security platform. In some implementations, the security platform may store such information so that the security platform may process such information to generate a security policy to isolate the compromised endpoint device.

Figure 1D:
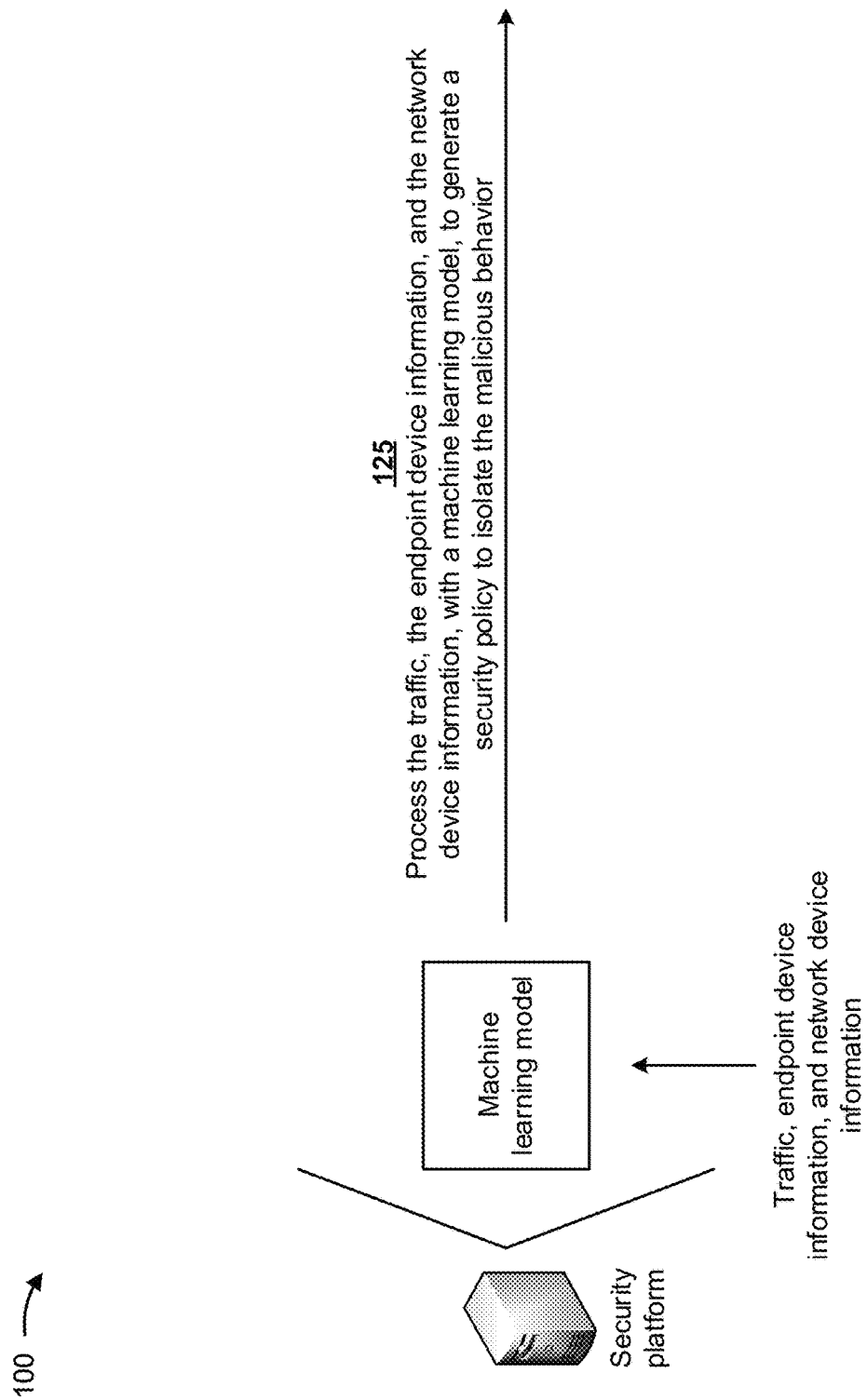

As shown in FIG. 1D, and by reference number 125, the security platform may process the traffic associated with the compromised endpoint device, the endpoint device information, and the network device information, with a machine learning model, to generate a security policy to isolate the malicious behavior. For example, the machine learning model may generate the security policy by identifying one or more security rules to be implemented by one or more of the network devices and/or one or more of the other endpoint devices.

Examples of security rules that may be included in the security policy include a security rule that causes a network address of the compromised endpoint device to be added to a traffic feed of the compromised endpoint device and/or to be associated with a tag and/or metadata; a security rule that temporarily adds the network address of the compromised endpoint device to a blacklist and causes the blacklist to be propagated to the network devices and/or the other endpoint devices based on network addresses of the network devices and the other endpoint devices; a security rule that defines groups of the network devices based on the network addresses of the network devices; a security rule that defines groups of the other endpoint devices based on the network addresses of the other endpoint devices; a security rule that prevents the compromised endpoint device from accessing the network; a security rule that modifies security rules associated with the network devices; a security rule that modifies intrusion prevention system rules associated with the network; a security rule that notifies one or more of the network devices of the compromised endpoint device; a security rule that causes one or more of the network devices to perform an action; and/or the like. These are merely examples of security rules that might be included in a security policy and the security rules may be different in a different context.

In some implementations, the security platform may train the machine learning model, with historical data, to identify security rules (or more likely, the machine learning model determines confidence scores for security rules and/or identifies top scoring security rules) for a current malicious behavior situation (e.g., associated with the traffic of the compromised endpoint device, the endpoint device information, and the network device information). The historical data may include information identifying malicious behavior exhibited by the compromised endpoint devices; information identifying effects of the malicious behavior on networks, network devices, and/or other endpoint devices; historical traffic associated with compromised endpoint devices; historical endpoint device information; historical network device information; historical topology information; security rules or actions that were implemented and were successful or unsuccessful; and/or the like.

The security platform may separate the historical data into a training set, a validation set, a test set, and/or the like. The training set may be utilized to the train the machine learning model. The validation set may be utilized to validate results of the trained machine learning model. The test set may be utilized to test operation of the machine learning model. In some implementations, the security platform may train the machine learning model using, for example, an unsupervised training procedure and based on the historical data. For example, the security platform may perform dimensionality reduction to reduce the historical data to a minimum feature set, thereby reducing resources (e.g., processing resources, memory resources, and/or the like) to train the machine learning model and may apply a classification technique to the minimum feature set.

In some implementations, the security platform may use a logistic regression classification technique to determine a categorical outcome (e.g., security rules generated based on the traffic of the compromised endpoint device, the endpoint device information, and the network device information). Additionally, or alternatively, the security platform may use a naïve Bayesian classifier technique. In this case, the security platform may perform binary recursive partitioning to split the historical data into partitions and/or branches and use the partitions and/or branches to perform predictions (e.g., security rules generated based on the traffic of the compromised endpoint device, the endpoint device information, and the network device information). Based on using recursive partitioning, the security platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the security platform may use a support vector machine (SVM) classifier technique to generate a non-linear boundary between data points in the training set. In this case, the non-linear boundary is used to classify test data into a particular class.

Additionally, or alternatively, the security platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the security platform may use one or more other model training techniques, such as a neural network technique, a latent semantic indexing technique, and/or the like. For example, the security platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the security platform by being more robust to noisy, imprecise, or incomplete data, and by enabling the security platform to detect patterns and/or trends undetectable to human analysts or systems using less complex techniques.

In some implementations, the security platform may include input the traffic (e.g., traffic information) associated with the comprised endpoint device, the endpoint device information, and the network device information into the machine learning model and the machine learning model may output a set of security rules (e.g., top scoring security rules) for the security policy.

Figure 1E:
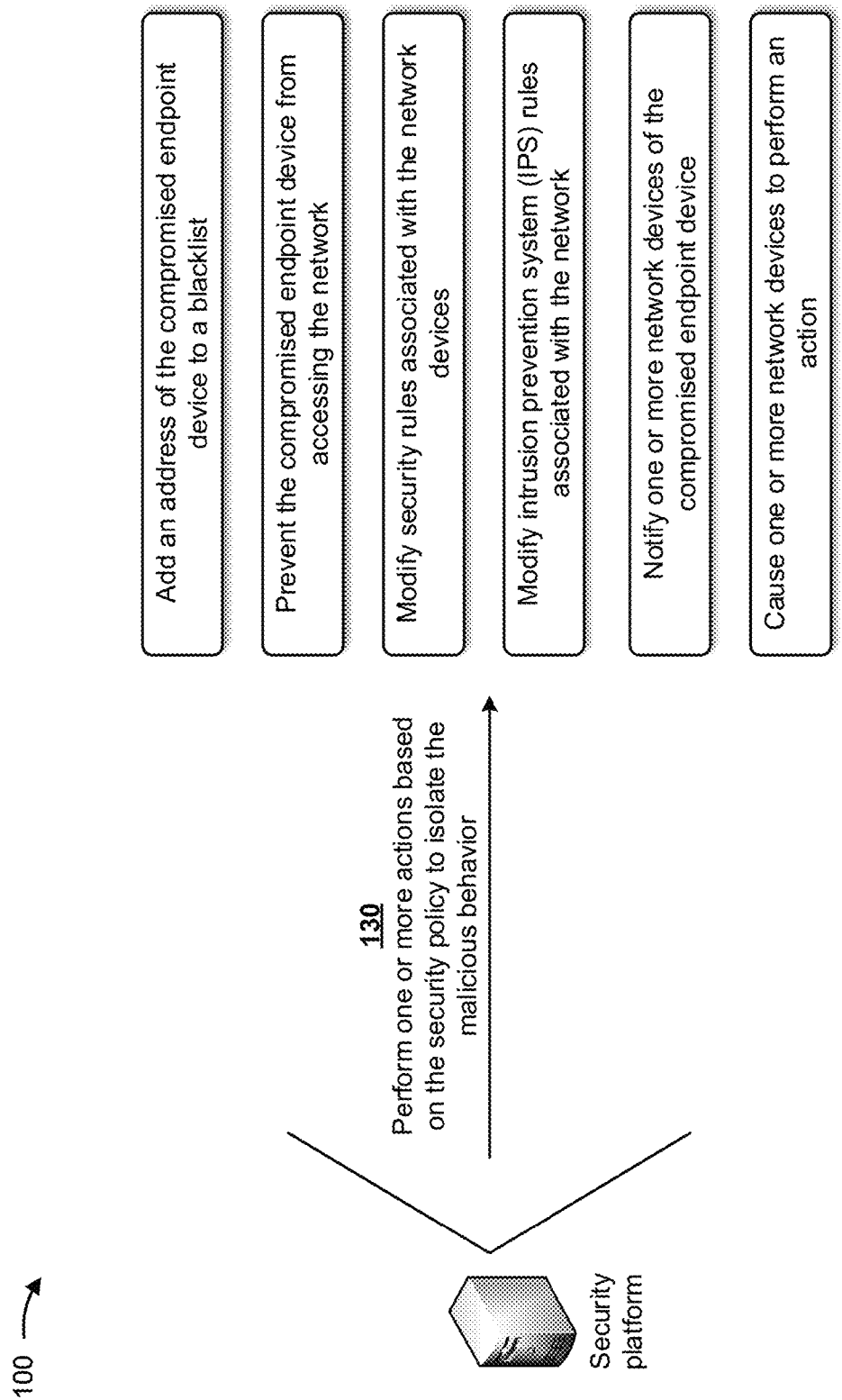

As shown in FIG. 1E, and by reference number 130, the security platform may perform one or more actions based on the security policy to isolate the malicious behavior. In some implementations, the security platform may generate a security policy that has potentially multiple security rules (or actions as described elsewhere herein). In such implementations, the security platform may determine an order to implement the multiple security rules. In some implementations, the security platform may implement some security rules before other security rules, may implement some security rules at the same time, and/or the like. In some implementations, the machine learning model may output information that assists the security platform in determining the order to implement the security rules, or the security platform may utilize a different model to determine the order to implement the security rules. An input to the different model may include a list of the security rules to implement and an output of the different model may include the order to implement the security rules.

In some implementations, the security platform may add an address (e.g., an IP address) of the compromised endpoint device to a blacklist so that the compromised endpoint device may be prevented from accessing the network and/or the other endpoint devices. In this way, the compromised endpoint device may be prevented from spreading the malicious behavior to the network and/or the other endpoint devices.

In some implementations, the security platform may prevent the compromised endpoint device from accessing the network by causing a network address of the compromised endpoint device to be added to a traffic feed of the compromised endpoint device. In this way, the network devices may recognize and block traffic coming from the compromised endpoint device.

In some implementations, the security platform may modify or update security rules associated with the network devices so that the network devices may increase security associated with accessing the network and prevent the compromised endpoint device from spreading the malicious behavior to the network.

In some implementations, the security platform may modify or update rules for a network device (e.g., an intrusion prevention system) associated with the network to increase security associated with accessing the network and prevent the compromised endpoint device from spreading the malicious behavior to the network.

In some implementations, the security platform may notify one or more network devices of the compromised endpoint device. In this way, the one or more network devices may take measures to block traffic coming from the compromised endpoint device.

In some implementations, the security platform may cause one or more network devices to perform an action, such as block traffic coming from the compromised endpoint device, quarantine traffic coming from the compromised endpoint device, and/or the like. In this way, the compromised endpoint device may be prevented from spreading the malicious behavior to the network and/or the other endpoint devices.

In some implementations, the security platform may push a security update to the compromised endpoint device so that the compromised endpoint device may be better protected from a bad actor. In this way, the security update may eliminate the malicious behavior from the compromised endpoint device.

In some implementations, the security platform may cause the compromised endpoint device to initiate a malware and/or a virus scan to ensure that the compromised endpoint device is not infected with malware and/or a virus. In some implementations, the security platform may cause the compromised endpoint device to be taken offline (e.g., disconnect from the network) so that the compromised endpoint device may not harm the network. In some implementations, the security platform may send a notification for display on the compromised endpoint device (e.g., to inform a user that the endpoint device has been compromised).

Figure 1F:
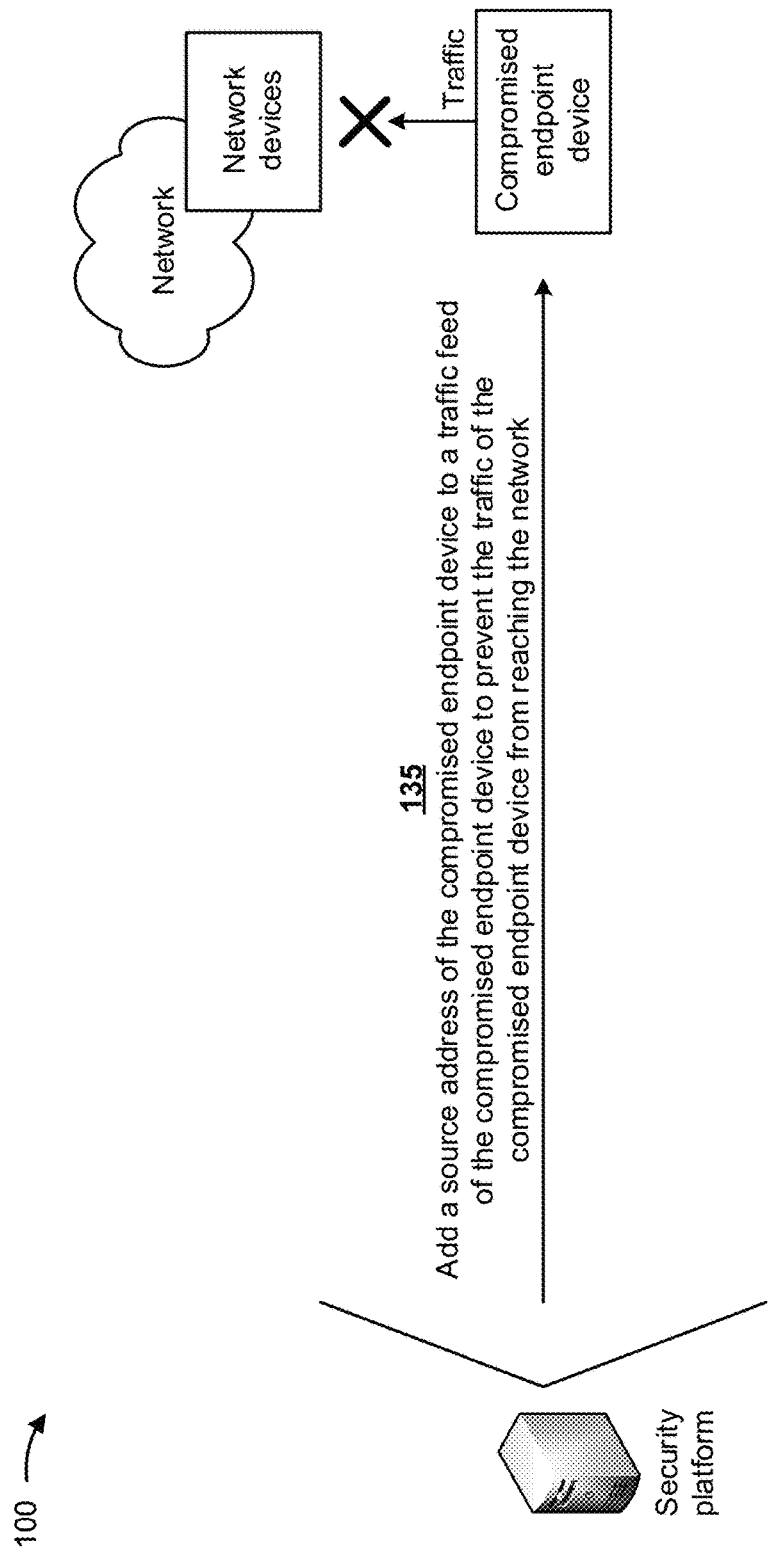

As shown in FIG. 1F, and by reference number 135, the security platform may add a source address of the compromised endpoint device to a traffic feed of the compromised endpoint device to prevent the traffic of the compromised endpoint device from reaching the network. In some implementations, the source address of the compromised endpoint device may enable the network devices to recognize and block (or quarantine) traffic coming from the compromised endpoint device. For example, as further shown in FIG. 1F, the network devices may block the traffic coming from the compromised endpoint device based on the source address of the compromised endpoint device. In this way, the network devices may recognize and prevent traffic, coming from the compromised endpoint device, from reaching the network.

As shown in FIG. 1G, and by reference number 140, the security platform may temporarily add a destination address of the compromised endpoint device, with an expiration date, to a first blacklist and may cause the first blacklist to be propagated to the network devices. In some implementations, the destination address may be associated with an expiration date so that the destination address is removed from the first blacklist on the expiration date. In this way, the security platform may ensure that a file size of the first blacklist remains manageable and consumes minimal memory space in the network devices. In some implementations, the destination address of the compromised endpoint device may not be associated with an expiration date and may not be removed from the first blacklist.

As further shown in FIG. 1G, the security platform may temporarily add the destination address of the compromised endpoint device, with the expiration date, to the first blacklist and may provide the first blacklist to a first network device (e.g., network device 1). The security platform may also provide, to the first network device, an instruction that causes the first network device to provide the first blacklist to the other network devices (e.g., network device 2 through network device N). In some implementations, the destination address of the compromised endpoint device may enable the network devices to recognize and block traffic from the network and destined for the compromised endpoint device. For example, as further shown in FIG. 1G, the network devices may block the traffic coming from the network and destined for the compromised endpoint device based on the destination address of the compromised endpoint device. In this way, the network devices may recognize and prevent traffic, coming from the network, from reaching the compromised endpoint device.

Figure 1H:
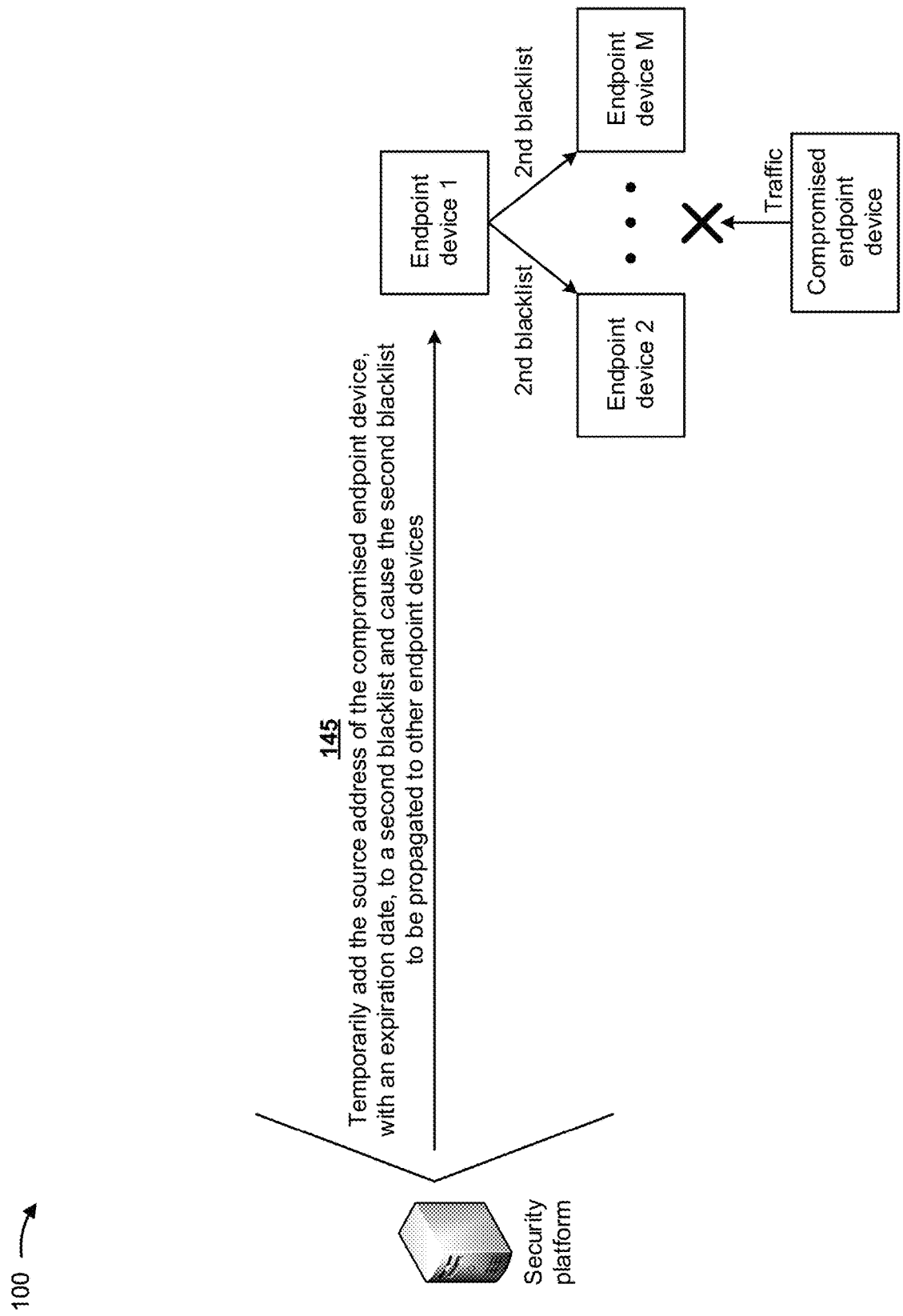

As shown in FIG. 1H, and by reference number 145, the security platform may temporarily add the source address of the compromised endpoint device, with an expiration date, to a second blacklist and may cause the second blacklist to be propagated to the other endpoint devices. In some implementations, the source address may be associated with an expiration date so that the source address is removed from the second blacklist on the expiration date. In this way, the security platform may ensure that a file size of the second blacklist remains manageable and consumes minimal memory space in the other endpoint devices. In some implementations, the source address of the compromised endpoint device may not be associated with an expiration date and may not be removed from the second blacklist.

As further shown in FIG. 1H, the security platform may temporarily add the source address of the compromised endpoint device, with the expiration date, to the second blacklist and may provide the second blacklist to a first other endpoint device (e.g., endpoint device 1). The security platform may also provide, to the first other endpoint device, an instruction that causes the first other endpoint device to provide the second blacklist to the other endpoint devices (e.g., endpoint device 2 through endpoint device M). In some implementations, the source address of the compromised endpoint device may enable the other endpoint devices to recognize and block (or quarantine) traffic from the compromised endpoint device. For example, as further shown in FIG. 1H, the other endpoint devices may block the traffic coming from the compromised endpoint device based on the source address of the compromised endpoint device. In this way, the other endpoint devices may recognize and prevent traffic, coming from the compromised endpoint device, from reaching the other endpoint devices.

Figure 1I:
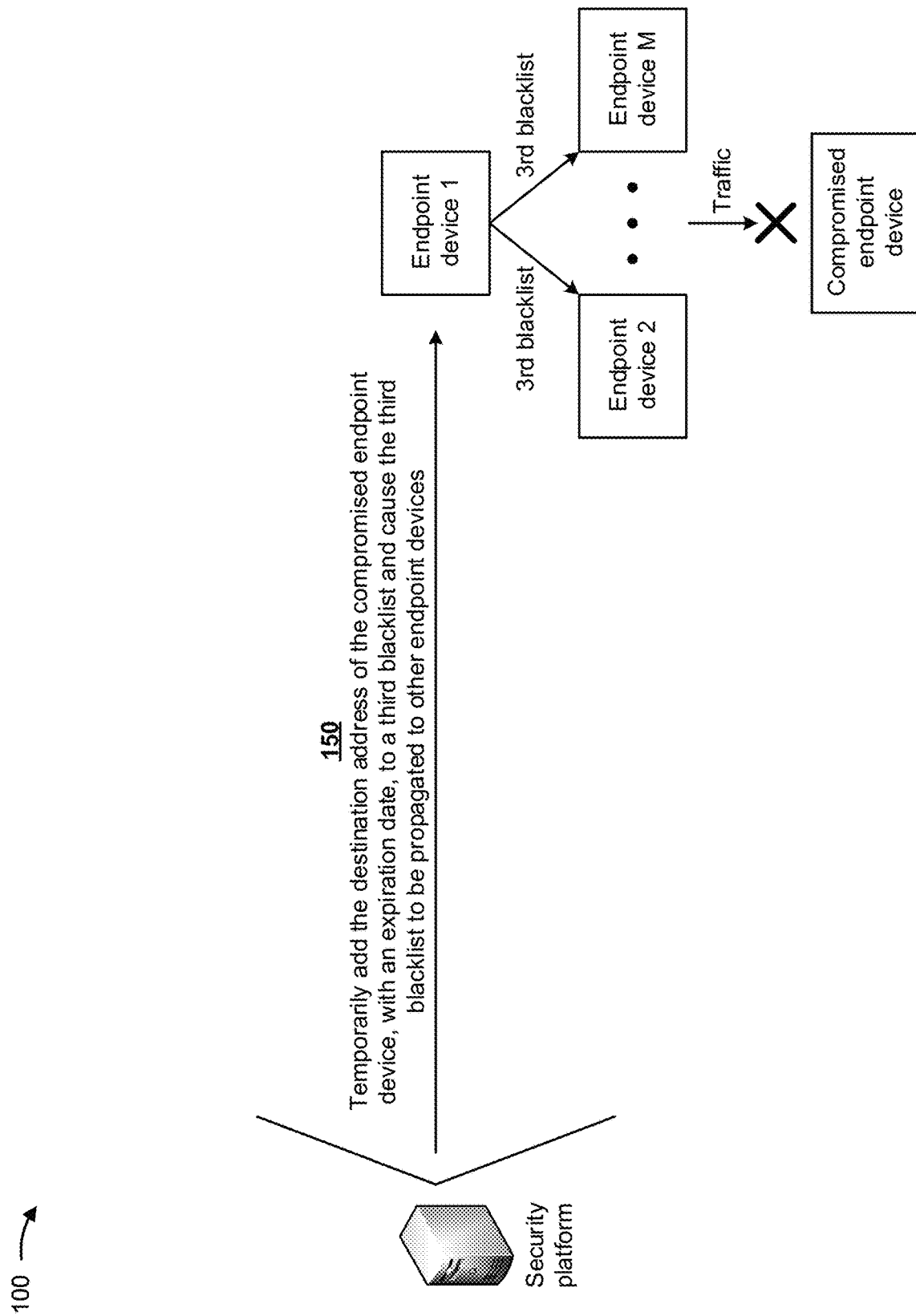

As shown in FIG. 1I, and by reference number 150, the security platform may temporarily add the destination address of the compromised endpoint device, with an expiration date, to a third blacklist and may cause the third blacklist to be propagated to the other endpoint devices. In some implementations, the destination address may be associated with an expiration date so that the destination address is removed from the third blacklist on the expiration date. In this way, the security platform may ensure that a file size of the third blacklist remains manageable and consumes minimal memory space in the other endpoint devices. In some implementations, the destination address of the compromised endpoint device may not be associated with an expiration date and may not be removed from the third blacklist.

As further shown in FIG. 1I, the security platform may temporarily add the destination address of the compromised endpoint device, with the expiration date, to the third blacklist and may provide the third blacklist to a first other endpoint device (e.g., endpoint device 1). The security platform may also provide, to the first other endpoint device, an instruction that causes the first other endpoint device to provide the third blacklist to the other endpoint devices (e.g., endpoint device 2 through endpoint device M). In some implementations, the destination address of the compromised endpoint device may enable the other endpoint devices to recognize and block traffic from the other endpoint devices and destined for the compromised endpoint device. For example, as further shown in FIG. 1I, the other endpoint devices may block the traffic coming from the other endpoint devices and destined for the compromised endpoint device based on the destination address of the compromised endpoint device. In this way, the other endpoint devices may recognize and prevent traffic, coming from the other endpoint devices, from reaching the compromised endpoint device.

In some implementations, the security platform may receive information identifying additional malicious behavior associated with one of the other endpoint devices and may compare the information identifying the additional malicious behavior with the security policy. In such implementations, the security platform may determine whether the additional malicious behavior is associated with one or more security rules of the security policy based on comparing the information identifying the additional malicious behavior with the security policy and may perform one or more additional actions when the additional malicious behavior is associated with the one or more security rules.

In some implementations, the security platform may process thousands, millions, billions or more of malicious behavior stored on hundreds, thousands, millions, or more endpoint devices and provided to hundreds, thousands, millions, or more network devices. In such implementations, the security platform may concurrently process identifications of tens, hundreds, thousands, or more of malicious behavior in a given time window.

In this way, several different stages of the process for remediating for malicious behavior in a network may be automated through machine learning, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique to monitor a network for malicious behavior and to generate a network security policy based on behavior detected after identification of the malicious behavior. Automating the process for monitoring a network for malicious behavior conserves computing resources (e.g., processing resources, memory resources, and/or the like) and/or network resources that would otherwise be wasted in attempting to monitor a network for malicious. Finally, automating the process for monitoring a network for malicious behavior improves network operations and improves operations of the network device and the endpoint devices associated with the network.

As indicated above, FIGS. 1A-1I are provided merely as examples. Other examples may differ from what was described with regard to FIGS. 1A-1I.

Figure 2:
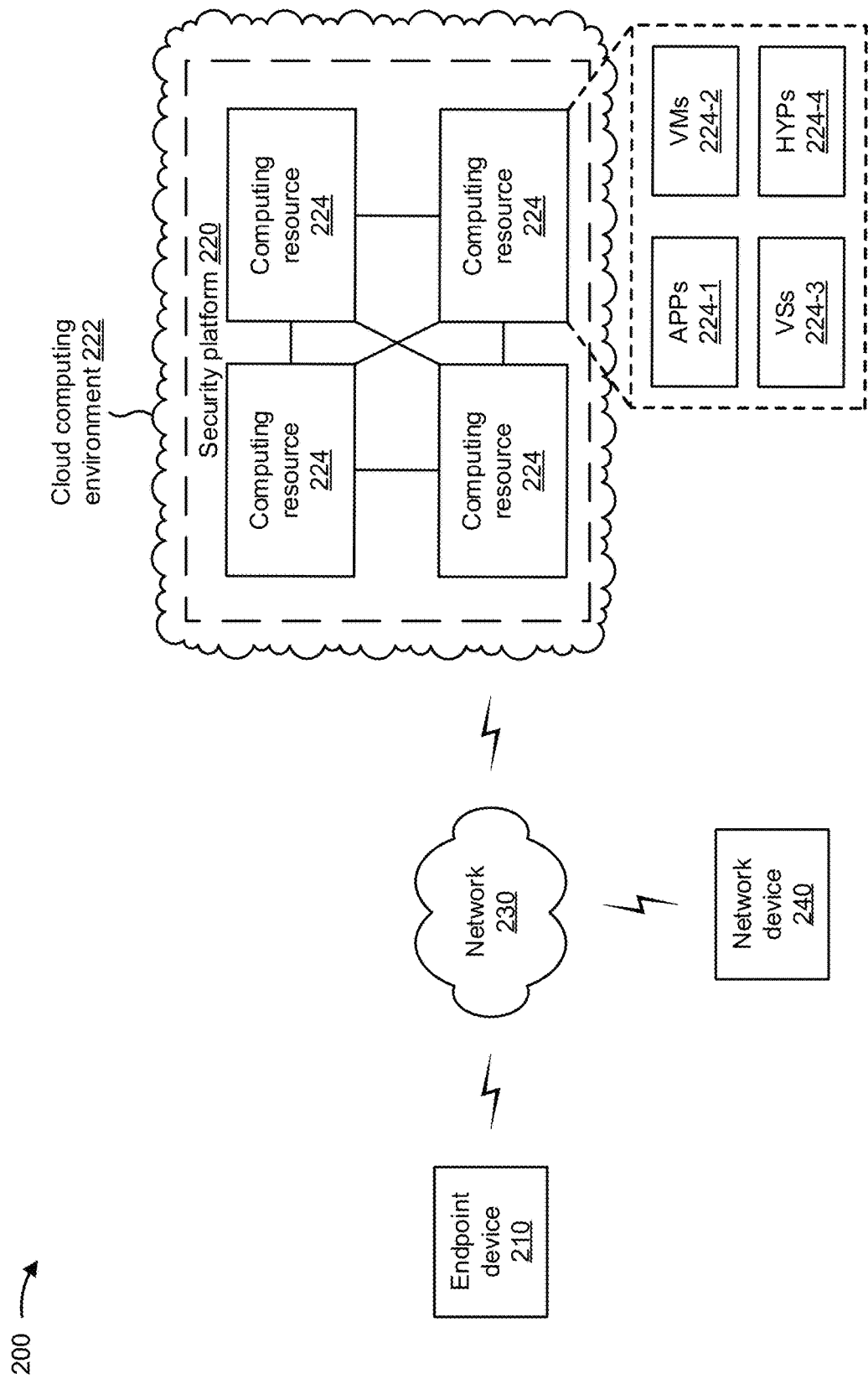
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an endpoint device 210, a security platform 220, a network 230, and a network device 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a data center computer, a cloud computing resource, an edge device, a customer premises equipment, or a similar type of device. In some implementations, endpoint device 210 may receive information from and/or transmit information to one or more other devices of environment 200. In some implementations, endpoint device 210 may be an endpoint device of network 230.

Security platform 220 includes one or more devices that generate a network security policy based on behavior detected after identification of malicious behavior. In some implementations, security platform 220 may be designed to be modular such that certain software components may be swapped in or out depending on a particular need. As such, security platform 220 may be easily and/or quickly reconfigured for different uses. In some implementations, security platform 220 may receive information from and/or transmit information to one or more other devices of environment 200.

In some implementations, as shown, security platform 220 may be hosted in a cloud computing environment 222. Notably, while implementations described herein describe security platform 220 as being hosted in cloud computing environment 222, in some implementations, security platform 220 may not be cloud-based (i.e., may be implemented outside of a cloud computing environment, such as within one or more server devices) or may be partially cloud-based.

Cloud computing environment 222 includes an environment that hosts security platform 220. Cloud computing environment 222 may provide computation, software, data access, storage, etc. services that do not require end-user knowledge of a physical location and configuration of system(s) and/or device(s) that hosts security platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host security platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by endpoint device 210. Application 224-1 may eliminate a need to install and execute the software applications on endpoint device 210. For example, application 224-1 may include software associated with security platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of endpoint device 210 or an operator of security platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices (e.g., one or more traffic transfer devices) capable of receiving, providing, storing, generating, and/or processing information described herein. For example, network device 240 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 240 may receive information from and/or provide information to one or more other devices of environment 200. In some implementations, network device 240 may be a physical device implemented within a housing, such as a chassis. In some implementations, network device 240 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
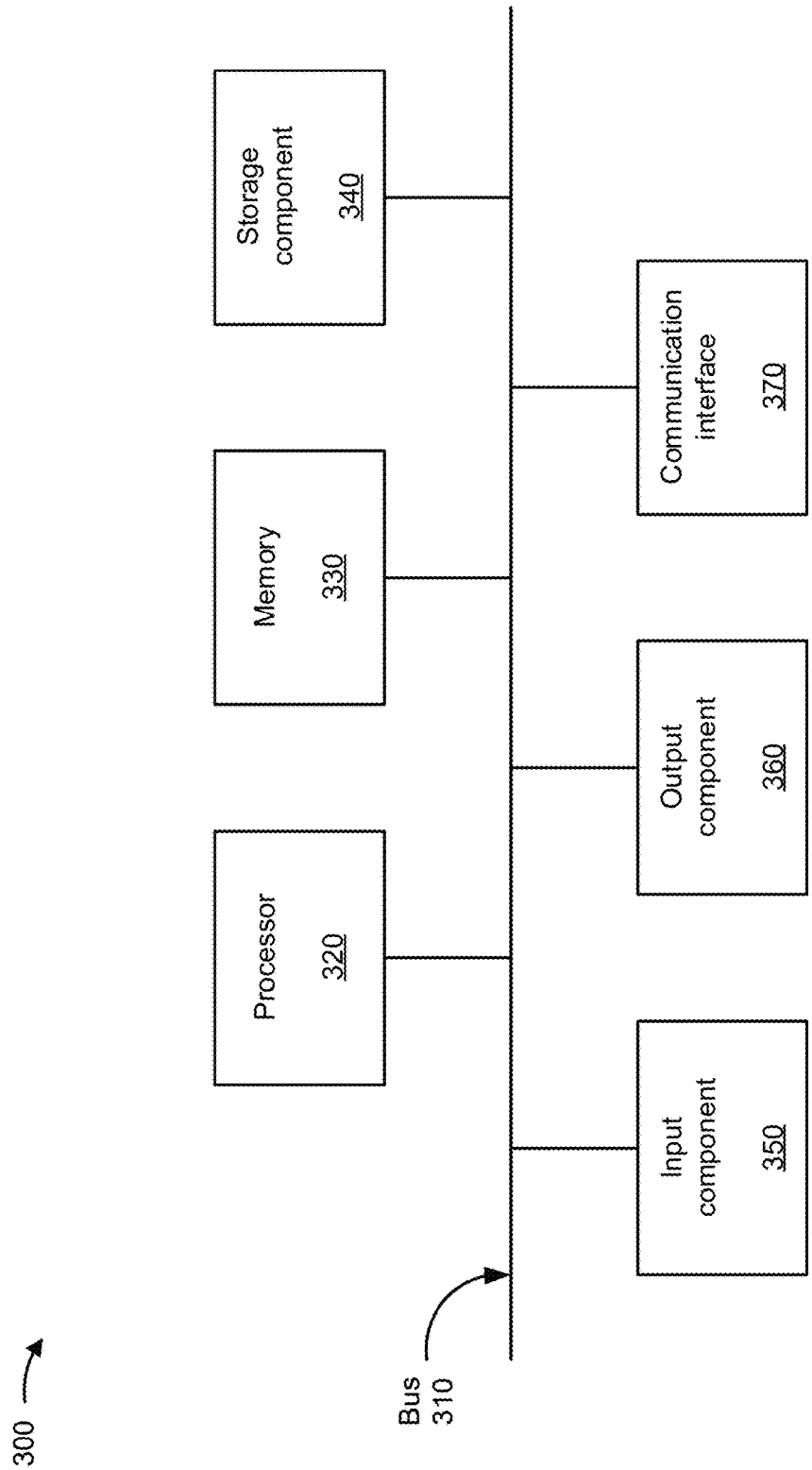
FIG. 3 is a diagram of example components of one or more devices of FIG. 2.

FIG. 3 is a diagram of example components of a device 300. Device 300 may correspond to endpoint device 210, security platform 220, computing resource 224, and/or network device 240. In some implementations, endpoint device 210, security platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
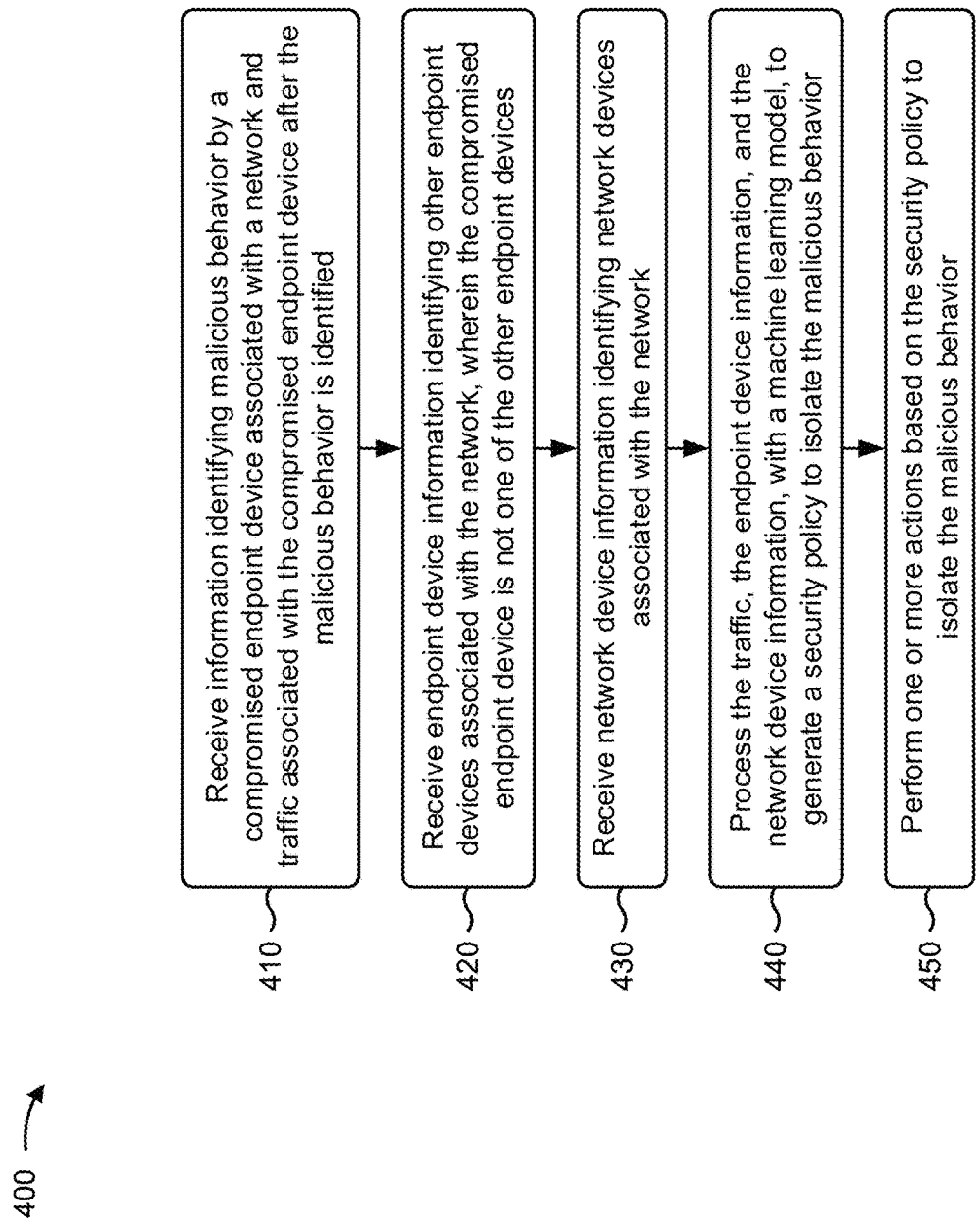

FIG. 4 is a flow chart of an example process 400 for generating a network security policy based on behavior detected after identification of malicious behavior. In some implementations, one or more process blocks of FIG. 4 may be performed by a security platform (e.g., security platform 220). In some implementations, one or more process blocks of FIG. 4 may be performed by another device or a group of devices separate from or including the security platform, such as an endpoint device (e.g., endpoint device 210) and/or a network device (e.g., network device 240).

As shown in FIG. 4, process 400 may include receiving information identifying malicious behavior by a compromised endpoint device associated with a network and traffic associated with the compromised endpoint device after the malicious behavior is identified (block 410). For example, the security platform (e.g., using computing resource 224, processor 320, communication interface 370, and/or the like) may receive information identifying malicious behavior by a compromised endpoint device associated with a network and traffic associated with the compromised endpoint device after the malicious behavior is identified, as described above in connection with FIGS. 1A-2.

As further shown in FIG. 4, process 400 may include receiving endpoint device information identifying other endpoint devices associated with the network, wherein the compromised endpoint device is not one of the other endpoint devices (block 420). For example, the security platform (e.g., using computing resource 224, processor 320, communication interface 370, and/or the like) may receive endpoint device information identifying other endpoint devices associated with the network, as described above in connection with FIGS. 1A-2. In some implementations, the compromised endpoint device is not one of the other endpoint devices.

As further shown in FIG. 4, process 400 may include receiving network device information identifying network devices associated with the network (block 430). For example, the security platform (e.g., using computing resource 224, processor 320, communication interface 370, and/or the like) may receive network device information identifying network devices associated with the network, as described above in connection with FIGS. 1A-2.

As further shown in FIG. 4, process 400 may include processing the traffic, the endpoint device information, and the network device information, with a machine learning model, to generate a security policy to isolate the malicious behavior (block 440). For example, the security platform (e.g., using computing resource 224, processor 320, storage component 340, and/or the like) may process the traffic, the endpoint device information, and the network device information, with a machine learning model, to generate a security policy to isolate the malicious behavior, as described above in connection with FIGS. 1A-2.

As further shown in FIG. 4, process 400 may include performing one or more actions based on the security policy to isolate the malicious behavior (block 450). For example, the security platform (e.g., using computing resource 224, processor 320, memory 330, communication interface 370, and/or the like) may perform one or more actions based on the security policy to isolate the malicious behavior, as described above in connection with FIGS. 1A-2.

Process 400 may include additional implementations, such as any single implementation or any combination of implementations described below and/or in connection with one or more other processes described elsewhere herein.

In some implementations, when performing the one or more actions, the security platform may add an address of the compromised endpoint device to a blacklist and provide the blacklist to the network devices and the other endpoint devices, prevent the compromised endpoint device from accessing the network, modify security rules associated with the network devices, modify intrusion prevention system rules associated with the network, notify one or more of the network devices of the compromised endpoint device, and/or cause one or more of the network devices to perform an action.

In some implementations, when performing the one or more actions, the security platform may add a source address of the compromised endpoint device to a traffic feed of the compromised endpoint device to prevent the traffic associated with the compromised endpoint device from reaching the network.

In some implementations, when performing the one or more actions, the security platform may temporarily add a destination address of the compromised endpoint device to a blacklist and may cause the blacklist to be propagated to the network devices, where the blacklist, after the destination address is added, is to cause the network devices to prevent traffic of the network from being provided to the compromised endpoint device.

In some implementations, when performing the one or more actions, the security platform may temporarily add a source address of the compromised endpoint device to a blacklist and may cause the blacklist to be propagated to the other endpoint devices, where the blacklist, after the source address is added, is to prevent the traffic associated with the compromised endpoint device from reaching the other endpoint devices.

In some implementations, when performing the one or more actions, the security platform may temporarily add a destination address of the compromised endpoint device to a blacklist and may cause the blacklist to be propagated to the other endpoint devices, where the blacklist, after the destination address is added, is to prevent traffic of the other endpoint devices from being provided to the compromised endpoint device.

In some implementations, the machine learning model may generate the security policy by identifying network addresses of the compromised endpoint device, the other endpoint devices, and the network devices based on the traffic, the endpoint device information, and the network device information, by generating a security rule for the security policy that causes a network address of the compromised endpoint device to be added to a traffic feed of the compromised endpoint device, and by generating a security rule for the security policy that temporarily adds the network address of the compromised endpoint device to a blacklist and causes the blacklist to be propagated to the network devices and the endpoint devices based on network addresses of the network devices and the endpoint devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
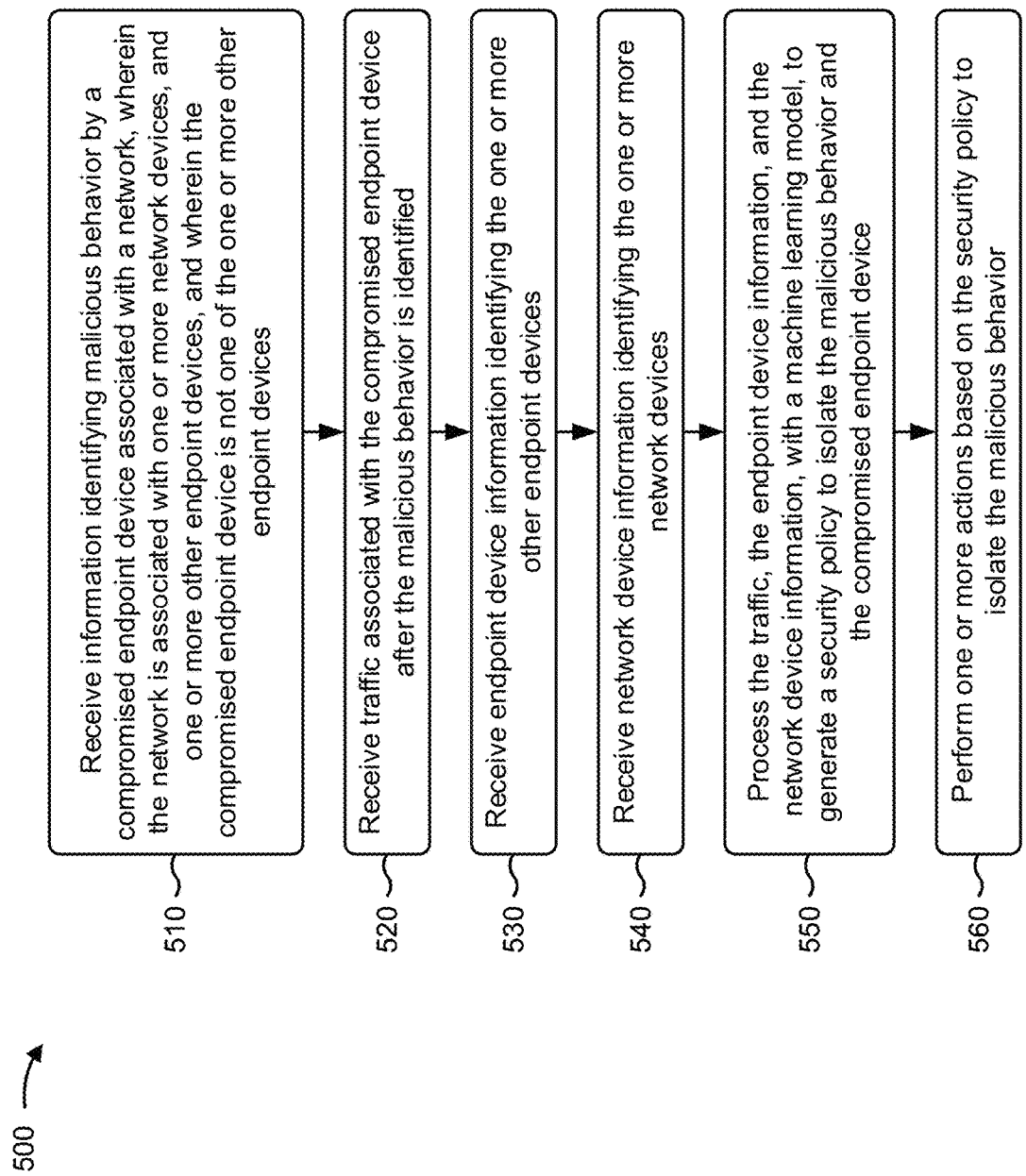

FIG. 5 is a flow chart of an example process 500 for generating a network security policy based on behavior detected after identification of malicious behavior. In some implementations, one or more process blocks of FIG. 5 may be performed by a security platform (e.g., security platform 220). In some implementations, one or more process blocks of FIG. 5 may be performed by another device or a group of devices separate from or including the security platform, such as an endpoint device (e.g., endpoint device 210) and/or a network device (e.g., network device 240).

As shown in FIG. 5, process 500 may include receiving information identifying malicious behavior by a compromised endpoint device associated with a network, wherein the network is associated with one or more network devices, and one or more other endpoint devices, and wherein the compromised endpoint device is not one of the one or more other endpoint devices (block 510). For example, the security platform (e.g., using computing resource 224, processor 320, memory 330, communication interface 370, and/or the like) may receive information identifying malicious behavior by a compromised endpoint device associated with a network, as described above in connection with FIGS. 1A-2. In some implementations, the network may be associated with one or more network devices and one or more other endpoint devices. In some implementations, the compromised endpoint device is not one of the one or more other endpoint devices.

As further shown in FIG. 5, process 500 may include receiving traffic associated with the compromised endpoint device after the malicious behavior is identified (block 520). For example, the security platform (e.g., using computing resource 224, processor 320, storage component 340, communication interface 370, and/or the like) may receive traffic associated with the compromised endpoint device after the malicious behavior is identified, as described above in connection with FIGS. 1A-2.

As further shown in FIG. 5, process 500 may include receiving endpoint device information identifying the one or more other endpoint devices (block 530). For example, the security platform (e.g., using computing resource 224, processor 320, memory 330, communication interface 370, and/or the like) may receive endpoint device information identifying the one or more other endpoint devices, as described above in connection with FIGS. 1A-2.

As further shown in FIG. 5, process 500 may include receiving network device information identifying the one or more network devices (block 540). For example, the security platform (e.g., using computing resource 224, processor 320, storage component 340, communication interface 370, and/or the like) may receive network device information identifying the one or more network devices, as described above in connection with FIGS. 1A-2.

As further shown in FIG. 5, process 500 may include processing the traffic, the endpoint device information, and the network device information, with a machine learning model, to generate a security policy to isolate the malicious behavior and the compromised endpoint device (block 550). For example, the security platform (e.g., using computing resource 224, processor 320, memory 330, and/or the like) may process the traffic, the endpoint device information, and the network device information, with a machine learning model, to generate a security policy to isolate the malicious behavior and the compromised endpoint device, as described above in connection with FIGS. 1A-2.

As further shown in FIG. 5, process 500 may include performing one or more actions based on the security policy to isolate the malicious behavior (block 560). For example, the security platform (e.g., using computing resource 224, processor 320, communication interface 370, and/or the like) may perform one or more actions based on the security policy to isolate the malicious behavior, as described above in connection with FIGS. 1A-2.

Process 500 may include additional implementations, such as any single implementation or any combination of implementations described below and/or in connection with one or more other processes described elsewhere herein.

In some implementations, the security platform may train the machine learning model with historical traffic associated with compromised endpoint devices prior to processing the traffic, the endpoint device information, and the network device information with the machine learning model.

In some implementations, when performing the one or more actions, the security platform may add an address of the compromised endpoint device to a blacklist, prevent the compromised endpoint device from accessing the network, modify security rules associated with the one or more network devices, modify intrusion prevention system rules associated with the network, notify the one or more network devices of the compromised endpoint device, and/or cause the one or more network devices to perform an action.

In some implementations, when performing the one or more actions, the security platform may add a source address of the compromised endpoint device to a traffic feed of the compromised endpoint device to prevent the traffic associated with the compromised endpoint device from reaching the network and the one or more other endpoint devices.

In some implementations, when performing the one or more actions, the security platform may add a destination address of the compromised endpoint device to a blacklist and may cause the blacklist to be propagated to the one or more network devices, where the blacklist, with the destination address added, is to cause the one or more network devices to prevent traffic of the network from being provided to the compromised endpoint device.

In some implementations, when performing the one or more actions, the security platform may add a source address of the compromised endpoint device to a blacklist and may cause the blacklist to be propagated to the one or more other endpoint devices, where the blacklist, with the source address added, is to prevent the traffic associated with the compromised endpoint device from reaching the one or more other endpoint devices.

In some implementations, when performing the one or more actions, the security platform may add a destination address of the compromised endpoint device to a blacklist and may cause the blacklist to be propagated to the one or more other endpoint devices, where the blacklist, with the destination address added, is to prevent traffic of the one or more other endpoint devices from being provided to the compromised endpoint device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for generating a network security policy based on behavior detected after identification of malicious behavior. In some implementations, one or more process blocks of FIG. 6 may be performed by a security platform (e.g., security platform 220). In some implementations, one or more process blocks of FIG. 6 may be performed by another device or a group of devices separate from or including the security platform, such as an endpoint device (e.g., endpoint device 210) and/or a network device (e.g., network device 240).

As shown in FIG. 6, process 600 may include receiving information identifying malicious behavior by a compromised endpoint device associated with a network (block 610). For example, the security platform (e.g., using computing resource 224, processor 320, memory 330, communication interface 370, and/or the like) may receive information identifying malicious behavior by a compromised endpoint device associated with a network, as described above in connection with FIGS. 1A-2.

As further shown in FIG. 6, process 600 may include receiving traffic associated with the compromised endpoint device after the malicious behavior is identified (block 620). For example, the security platform (e.g., using computing resource 224, processor 320, storage component 340, communication interface 370, and/or the like) may receive traffic associated with the compromised endpoint device after the malicious behavior is identified, as described above in connection with FIGS. 1A-2.

As further shown in FIG. 6, process 600 may include receiving endpoint device information identifying other endpoint devices associated with the network, wherein the compromised endpoint device is not one of the other endpoint devices (block 630). For example, the security platform (e.g., using computing resource 224, processor 320, memory 330, communication interface 370, and/or the like) may receive endpoint device information identifying other endpoint devices associated with the network, as described above in connection with FIGS. 1A-2. In some implementations, the compromised endpoint device is not one of the other endpoint devices.

As further shown in FIG. 6, process 600 may include receiving network device information identifying network devices associated with the network (block 640). For example, the security platform (e.g., using computing resource 224, processor 320, storage component 340, communication interface 370, and/or the like) may receive network device information identifying network devices associated with the network, as described above in connection with FIGS. 1A-2.

As further shown in FIG. 6, process 600 may include processing the traffic, the endpoint device information, and the network device information, with a model, to generate a security policy to isolate the malicious behavior (block 650). For example, the security platform (e.g., using computing resource 224, processor 320, memory 330, and/or the like) may process the traffic, the endpoint device information, and the network device information, with a model, to generate a security policy to isolate the malicious behavior, as described above in connection with FIGS. 1A-2.

As further shown in FIG. 6, process 600 may include adding a network address of the compromised endpoint device to a traffic feed of the compromised endpoint device, based on the security policy, to prevent the traffic associated with the compromised endpoint device from reaching the compromised endpoint device, the network, or the other endpoint devices (block 660). For example, the security platform (e.g., using computing resource 224, processor 320, storage component 340, communication interface 370, and/or the like) may add a network address of the compromised endpoint device to a traffic feed of the compromised endpoint device, based on the security policy, to prevent the traffic associated with the compromised endpoint device from reaching the compromised endpoint device, the network, or the other endpoint devices, as described above in connection with FIGS. 1A-2.

Process 600 may include additional implementations, such as any single implementation or any combination of implementations described below and/or in connection with one or more other processes described elsewhere herein.

In some implementations, the security platform may temporarily add a destination address of the compromised endpoint device to a blacklist based on the security policy and may cause the blacklist to be propagated to the network devices, where the blacklist, with the destination address added, is to cause the network devices to prevent traffic of the network from being provided to the compromised endpoint device.

In some implementations, the security platform may temporarily add a source address of the compromised endpoint device to a blacklist based on the security policy and may cause the blacklist to be propagated to the other endpoint devices, where the blacklist, with the source address added, is to prevent the traffic associated with the compromised endpoint device from reaching the other endpoint devices.

In some implementations, the security platform may temporarily add a destination address of the compromised endpoint device to a blacklist based on the security policy and may cause the blacklist to be propagated to the other endpoint devices, where the blacklist, with the destination address added, is to prevent traffic of the other endpoint devices from being provided to the compromised endpoint device.

In some implementations, the security platform may add the network address of the compromised endpoint device to a blacklist based on the security policy, prevent the compromised endpoint device from accessing the network based on the security policy, modify security rules associated with the network devices based on the security policy, modify intrusion prevention system rules associated with the network based on the security policy, notify one or more of the network devices of the compromised endpoint device based on the security policy, and/or cause one or more of the network devices to perform an action based on the security policy.

In some implementations, the security platform may receive information identifying additional malicious behavior associated with one of the other endpoint devices, may compare the information identifying the additional malicious behavior with the security policy, may determine whether the additional malicious behavior is associated with one or more security rules of the security policy based on comparing the information identifying the additional malicious behavior with the security policy, and may perform one or more actions when the additional malicious behavior is associated with the one or more security rules.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. As used herein, the term "traffic" is intended to be broadly construed as including one or more packets and the term "packet" is to be broadly construed as including a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information identifying malicious behavior by a compromised endpoint device associated with a network and traffic associated with the compromised endpoint device after the malicious behavior has been identified;
   receiving, by the device, endpoint device information identifying other endpoint devices associated with the network,
      wherein the compromised endpoint device is not one of the other endpoint devices;
   receiving, by the device, network device information identifying network devices associated with the network;
   processing, by the device, the traffic, the endpoint device information, and the network device information, with a machine learning model, to generate a security policy to isolate the malicious behavior; and
   performing, by the device, one or more actions based on the security policy to isolate the malicious behavior,
      wherein performing the one or more actions includes adding a source address of the compromised endpoint device to a traffic feed of the compromised endpoint device to prevent the traffic associated with the compromised endpoint device from reaching the network.

2. The method of claim 1, wherein performing the one or more actions includes one or more of:
   adding an address of the compromised endpoint device to a blacklist and providing the blacklist to the network devices and the other endpoint devices;
   modifying security rules associated with the network devices;
   modifying intrusion prevention system rules associated with the network;
   notifying one or more of the network devices of the compromised endpoint device; or
   causing one or more of the network devices to perform an action.

3. The method of claim 1, wherein performing the one or more actions includes:
   temporarily adding a destination address of the compromised endpoint device to a blacklist; and
   causing the blacklist to be propagated to the network devices,
      wherein the blacklist, after the destination address is added, is to cause the network devices to prevent traffic of the network from being provided to the compromised endpoint device.

4. The method of claim 1, wherein performing the one or more actions includes:
   temporarily adding the source address of the compromised endpoint device to a blacklist; and
   causing the blacklist to be propagated to the other endpoint devices,
      wherein the blacklist, after the source address is added, is to prevent the traffic associated with the compromised endpoint device from reaching the other endpoint devices.

5. The method of claim 1, wherein performing the one or more actions includes:
   temporarily adding a destination address of the compromised endpoint device to a blacklist; and
   causing the blacklist to be propagated to the other endpoint devices,
      wherein the blacklist, after the destination address is added, is to prevent traffic of the other endpoint devices from being provided to the compromised endpoint device.

6. The method of claim 1, wherein the machine learning model generates the security policy by:
   identifying network addresses of the compromised endpoint device, the other endpoint devices, and the network devices based on the traffic, the endpoint device information, and the network device information;
   generating a security rule for the security policy that causes a network address of the compromised endpoint device to be added to the traffic feed of the compromised endpoint device; and
   generating a security rule for the security policy that temporarily adds the network address of the compromised endpoint device to a blacklist and causes the blacklist to be propagated to the network devices and the other endpoint devices based on network addresses of the network devices and the other endpoint devices.

7. The method of claim 1, further comprising:
   temporarily adding a destination address of the compromised endpoint device to a blacklist,
      wherein the destination address has an expiration date; and
   removing the destination address from the blacklist on the expiration date.

8. A device, comprising:
   one or more memories; and
   one or more processors to:
      receive, after malicious behavior has been identified based on a compromised endpoint device associated with a network, information identifying the malicious behavior,
         wherein the network is associated with:
            one or more network devices, and
            one or more other endpoint devices,
               wherein the compromised endpoint device is not one of the one or more other endpoint devices;
      receive, after the malicious behavior has been identified, traffic associated with the compromised endpoint device;
      receive endpoint device information identifying the one or more other endpoint devices;
      receive network device information identifying the one or more network devices;
      process the traffic, the endpoint device information, and the network device information, with a machine learning model, to generate a security policy to isolate the malicious behavior and the compromised endpoint device; and
      perform one or more actions based on the security policy to isolate the malicious behavior;
         wherein the one or more processors, when performing the one or more actions, are to add a source address of the compromised endpoint device to a traffic feed of the compromised endpoint device to prevent the traffic associated with the compromised endpoint device from reaching the network.

9. The device of claim 8, wherein the one or more processors are further to:
   train the machine learning model with historical traffic associated with compromised endpoint devices prior to processing the traffic, the endpoint device information, and the network device information with the machine learning model.

10. The device of claim 8, wherein, when performing the one or more actions, the one or more processors are to one or more of:
    add an address of the compromised endpoint device to a blacklist;
    modify security rules associated with the one or more network devices;
    modify intrusion prevention system rules associated with the network;
    notify the one or more network devices of the compromised endpoint device; or
    cause the one or more network devices to perform an action.

11. The device of claim 8, wherein, when performing the one or more actions, the one or more processors are to:
    add a destination address of the compromised endpoint device to a blacklist; and
    cause the blacklist to be propagated to the one or more network devices,
       wherein the blacklist, with the destination address added, is to cause the one or more network devices to prevent traffic of the network from being provided to the compromised endpoint device.

12. The device of claim 8, wherein, when performing the one or more actions, the one or more processors are to:
    add the source address of the compromised endpoint device to a blacklist; and
    cause the blacklist to be propagated to the one or more other endpoint devices,
       wherein the blacklist, with the source address added, is to prevent the traffic associated with the compromised endpoint device from reaching the one or more other endpoint devices.

13. The device of claim 8, wherein, when performing the one or more actions, the one or more processors are to:
    add a destination address of the compromised endpoint device to a blacklist; and
    cause the blacklist to be propagated to the one or more other endpoint devices,
       wherein the blacklist, with the destination address added, is to prevent traffic of the one or more other endpoint devices from being provided to the compromised endpoint device.

14. The device of claim 8, wherein the one or more processors are further to:
    temporarily add a destination address of the compromised endpoint device to a blacklist,
       wherein the destination address has an expiration date; and remove the destination address from the blacklist on the expiration date.

15. A non-transitory computer-readable medium storing instructions, the instructions comprising:
one or more instructions that, when executed by one or more processors of a device, cause the one or more processors to:
receive, after malicious behavior has been identified based on a compromised endpoint device associated with a network, information identifying the malicious behavior;
receive, after the malicious behavior has been identified, traffic associated with the compromised endpoint device;
receive endpoint device information identifying other endpoint devices associated with the network,
wherein the compromised endpoint device is not one of the other endpoint devices;
receive network device information identifying network devices associated with the network;
process the traffic, the endpoint device information, and the network device information, with a model, to generate a security policy to isolate the malicious behavior; and
add a source address of the compromised endpoint device to a traffic feed of the compromised endpoint device, based on the security policy, to prevent the traffic associated with the compromised endpoint device from reaching the network or the other endpoint devices.

16. The non-transitory computer-readable medium of claim 15, wherein the instructions further comprise:
one or more instructions that, when executed by the one or more processors, cause the one or more processors to:
temporarily add a destination address of the compromised endpoint device to a blacklist based on the security policy; and
cause the blacklist to be propagated to the network devices,
wherein the blacklist, with the destination address added, is to cause the network devices to prevent traffic of the network from being provided to the compromised endpoint device.

17. The non-transitory computer-readable medium of claim 15, wherein the instructions further comprise:
one or more instructions that, when executed by the one or more processors, cause the one or more processors to:
temporarily add the source address of the compromised endpoint device to a blacklist based on the security policy; and
cause the blacklist to be propagated to the other endpoint devices,
wherein the blacklist, with the source address added, is to prevent the traffic associated with the compromised endpoint device from reaching the other endpoint devices.

18. The non-transitory computer-readable medium of claim 15, wherein the instructions further comprise:
one or more instructions that, when executed by the one or more processors, cause the one or more processors to:
temporarily add a destination address of the compromised endpoint device to a blacklist based on the security policy; and
cause the blacklist to be propagated to the other endpoint devices,
wherein the blacklist, with the destination address added, is to prevent traffic of the other endpoint devices from being provided to the compromised endpoint device.

19. The non-transitory computer-readable medium of claim 15, wherein the instructions further comprise:
one or more instructions that, when executed by the one or more processors, cause the one or more processors to one or more of:
add the source address of the compromised endpoint device to a blacklist based on the security policy;
modify security rules associated with the network devices based on the security policy;
modify intrusion prevention system rules associated with the network based on the security policy;
notify one or more of the network devices of the compromised endpoint device based on the security policy; or
cause one or more of the network devices to perform an action based on the security policy.

20. The non-transitory computer-readable medium of claim 15, wherein the instructions further comprise:
one or more instructions that, when executed by the one or more processors, cause the one or more processors to one or more of:
receive information identifying additional malicious behavior associated with one of the other endpoint devices;
compare the information identifying the additional malicious behavior with the security policy;
determine whether the additional malicious behavior is associated with one or more security rules of the security policy based on comparing the information identifying the additional malicious behavior with the security policy; and
perform one or more actions when the additional malicious behavior is associated with the one or more security rules.

* * * * *